B. V. MAXWELL & L. A. NICKERSON.
REPAIR TOOL.
APPLICATION FILED DEC. 23, 1912.
1,074,058.
Patented Sept. 23, 1913.
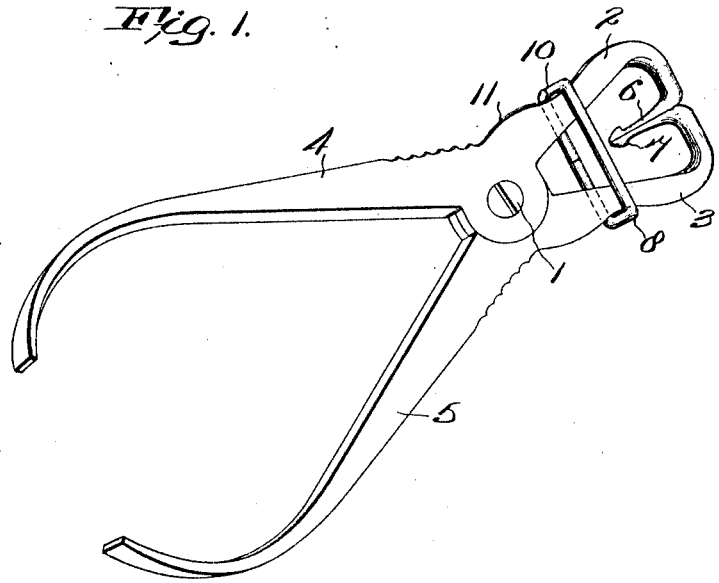
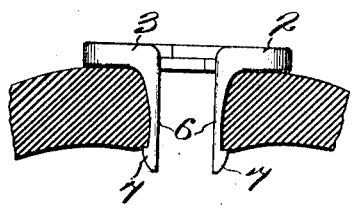
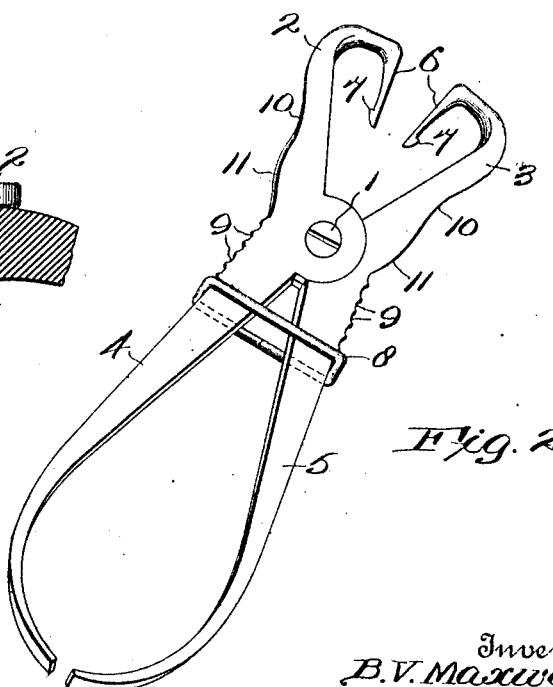
Witnesses
Edwin J Beller.
Inventors
B. V. Maxwell and
L. A. Nickerson.
by
G. Ayres
Attorney

UNITED STATES PATENT OFFICE.

BENJAMIN V. MAXWELL, OF WASHINGTON, DISTRICT OF COLUMBIA, AND LUKE A. NICKERSON, OF PHILADELPHIA, PENNSYLVANIA.

REPAIR-TOOL.

1,074,058.  Specification of Letters Patent.  Patented Sept. 23, 1913.

Application filed December 23, 1912. Serial No. 738,307.

*To all whom it may concern:*

Be it known that we, BENJAMIN V. MAXWELL and LUKE A. NICKERSON, citizens of the United States, residing at Washington, District of Columbia, and Philadelphia, Pennsylvania, respectively, have invented certain new and useful Improvements in Repair-Tools, of which the following is a specification.

Our invention relates to improvements in repair tools, and it consists in the constructions and arrangements shown and described.

An object of our invention is to provide an improved tool for repairing rubber tires.

A further object of our invention is to provide a strong and durable tool for forcibly expanding punctures or openings in tires and adapted to be positively locked in expanded position to permit the convenient insertion of repair material.

In the accompanying drawings forming a part of this application in which similar reference symbols indicate corresponding parts in the several views:—Figure 1 is a perspective view, illustrating one embodiment of our invention, with the coöperating expanding members tightly clamped in closed position; Fig. 2 is a similar view, showing the coöperating expanding members positively locked in open position; and Fig. 3 is an enlarged detail view, showing our improved tool applied for expanding a tire puncture.

Referring to the drawings, a pair of bent levers are pivotally connected at their bent portions 1 to provide diverging jaws 2 and 3, and handle portions 4 and 5. A pair of coöperating expanding members 6 are shown extending perpendicularly from the jaws 2 and 3 and terminating in outward barbed portions 7; said members being provided with plain inner faces adapted to engage throughout their length in closed position. A confining link 8 is slidably mounted on the levers in position to engage a series of recesses 9 in the outer edges of the diverging handle portions 4 and 5, for rigidly locking the coöperating expanding members in their open position. The outer edges of the jaws 2 and 3 are provided with seats 10 for clampingly receiving said link 8 to lock the coöperating expanding members 6 in their closed position; said seats being provided with inclined end portions 11 for wedging said link thereon.

In the operation of our invention, the coöperating members 6 are inserted in a tire puncture, and the handles 4 and 5 tightly gripped to force said members apart for expanding the puncture. The link 8 is then slid along the levers into engagement with the recesses 9 in the diverging outer edges of said handles for firmly locking said expanding members 6 in open position against the pressure of the tire. In this position of the parts, the barbed ends 7 of the expanding members 6 extend beneath the inner surface of the tire and effectively prevent the expanding pressure exerted on the tire from forcing, or crowding, the latter past the inner ends of the expanding members 6; thereby permitting the ready insertion of repair material through the expanded puncture, and eliminating danger of injury to the tire.

We have illustrated and described preferred and satisfactory constructions, but changes could be made within the spirit and scope of our invention.

We claim:—

A tool comprising a pair of bent levers pivotally connected at their bent portions to provide diverging jaws and handles, coöperating expanding members extending perpendicularly from said jaws and terminating in barbed portions, series of recessed seats formed in the outer walls of said diverging handles, a confining link slidably mounted on said levers for engaging such seats to lock said expanding members in open position, and seats formed on the outer walls of said diverging jaws for receiving said link and provided with inclined portions for wedging said link thereon.

In testimony whereof we affix our signatures in presence of two witnesses.

BENJAMIN V. MAXWELL.
LUKE A. NICKERSON.

Witnesses as to Benjamin V. Maxwell:
  JAMES B. GREEN,
  I. N. BEATTY.
Witnesses as to Luke A. Nickerson:
  JOHN W. WILSON,
  ANDREW J. WILSON.